United States Patent [19]

Poutanen et al.

[11] 4,309,160
[45] Jan. 5, 1982

[54] APPARATUS FOR FORMING FOAM-SKIN INSULATION ON TELEPHONE WIRES

[75] Inventors: Matti J. Poutanen, Helsinki; Aarne Heino, Espoo, both of Finland

[73] Assignee: Oy Nokia AB, Helsinki, Finland

[21] Appl. No.: 148,363

[22] Filed: May 9, 1980

[30] Foreign Application Priority Data

May 11, 1979 [FI] Finland ................................. 791512

[51] Int. Cl.³ .................... B29D 27/00; B29F 3/10
[52] U.S. Cl. ................................. 425/113; 264/45.9;
264/50; 264/53; 264/174; 264/DIG. 5; 425/4
C; 425/209; 425/462; 425/817 C
[58] Field of Search ................... 264/45.9, 46.1, 174,
264/50, 53, DIG. 5; 425/113, 817 C, 4 C, 209, 462

[56] References Cited

U.S. PATENT DOCUMENTS

| | | | |
|---|---|---|---|
| 3,782,870 | 1/1974 | Schippers | 264/46.1 X |
| 3,820,927 | 6/1974 | Toomajanian | 425/113 |
| 3,833,325 | 9/1974 | Ramsey | 425/113 |
| 3,860,686 | 1/1975 | Myers | 264/45.9 X |
| 3,903,233 | 9/1975 | Dougherty | 264/45.9 X |
| 3,905,749 | 9/1975 | Suzuki et al. | 425/113 |
| 3,914,357 | 10/1975 | Cereijo et al. | 264/45.9 X |
| 4,134,687 | 1/1979 | Eckardt | 425/817 R |

FOREIGN PATENT DOCUMENTS 1452179 2/1971 Fed. Rep. of Germany .
2853626 6/1979 Fed. Rep. of Germany .

Primary Examiner—Philip Anderson
Attorney, Agent, or Firm—Finnegan, Henderson, Farabow, Garrett & Dunner

[57] ABSTRACT

A method of forming a foam-skin insulation on telephone wires, wherein a homogenuous flow of basic plastic is divided into two separate flows one of which is subjected to mixing with a foam agent while the other, intended to form an outer layer of solid plastic, is bypassed directly to an extruder tool. The apparatus used for the method comprises one single extruder, the extruder head whereof is provided with a flow dividing piece guiding one flow past foam injecting nozzles and the other flow through a separate branch channel to the extruder tool.

5 Claims, 2 Drawing Figures

APPARATUS FOR FORMING FOAM-SKIN INSULATION ON TELEPHONE WIRES

The present invention relates to an apparatus for providing telephone wires with a plastic insulation. As insulation material for telephone wires there is generally used a solid plastic or a foamed plastic insulation. Recently the use of a so called foam-skin insulation has grown rapidly wherein on the wire is formed an inner layer of foamed plastic and on top of this layer is applied a layer of solid plastic, the operation being carried out in the same extrusion tool. A telephone wire having such a foam-skin insulation has, due to the foamed plastic, good electrical properties and the outer layer of solid plastic gives the wire good mechanical properties.

This process has in the past been performed in such a way that the flow of plastic mass to be foamed and the flow of plastic mass to the solid layer, have been brought to the extruder tool by using separate extruders. A drawback of this method is the second extruder as such and the fact that this second extruder needs space and makes the connection to the extruder tool complicated.

It is the object of the present invention to provide a new apparatus for forming a foam-skin insulation which eliminates these drawbacks.

According to the apparatus of the present invention only one plastic extruder is used into which extruder a basic plastic is fed in a conventional manner. In the extruder head the homogeneous flow of basic plastic is divided into two different flows. With one of these flows is intermixed a liquid or gaseous foam agent in a manner known per se. The correct ratio between the two flows may be controlled e.g. by means of a pressure throttling device or a control valve.

In the following the invention will be described with reference to the accompanying drawing which schematically shows one embodiment of the apparatus for carrying out the invention.

Figure 1:
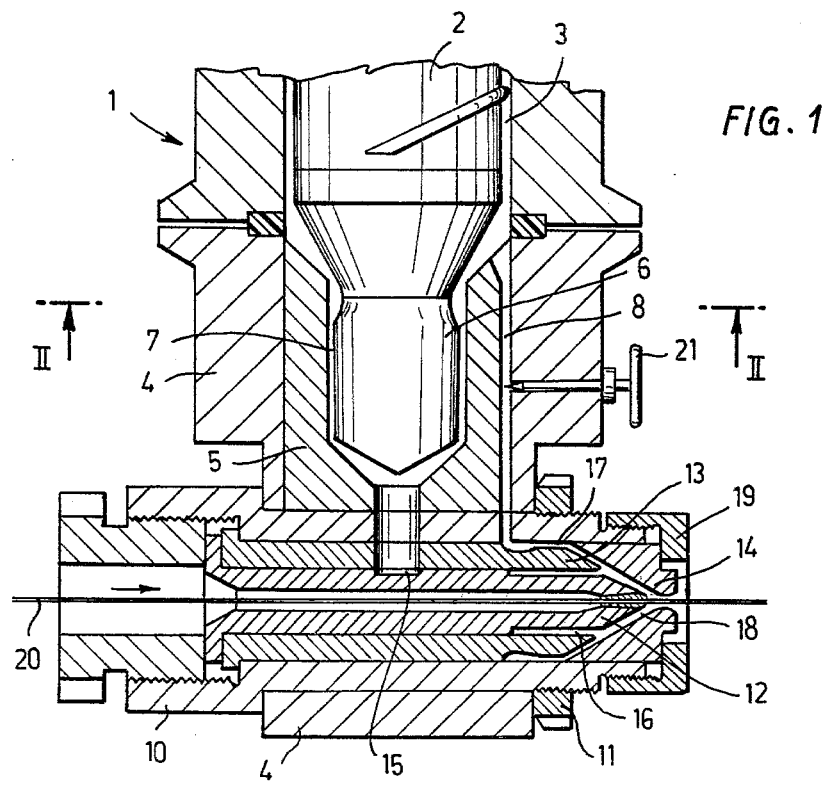
FIG. 1 is a sectional view of an extruder head and of an extruder tool, according to the invention.
Figure 2:
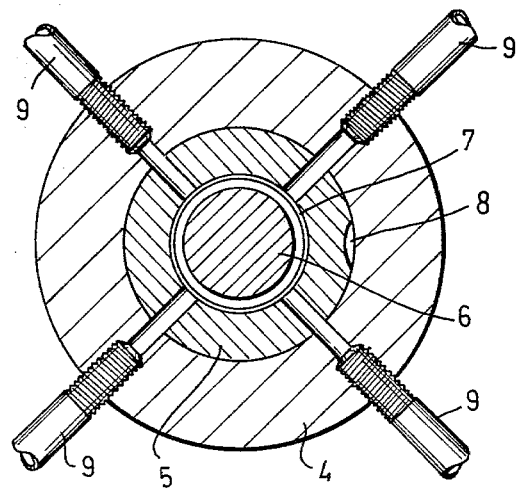
FIG. 2 shows a section taken along the line II—II in FIG. 1.

An extruder for plastic material to be used as an insulation for telephone wires is generally designated with reference numeral 1. The extruder comprises in a conventional manner a transport screw 2 as well as conventional heating means, not shown, for melting the plastic material. At the end of the extruder 1 is an extruder head which comprises an outer hollow cylinder 4 and mounted inside this cylinder 4 a second hollow cylinder 5. In the inner space of the cylinder 5 is arranged a mixer 6 which is at its outer surface provided with conventional means mixing means not shown in the drawing. In the cylinder 5 there is provided a separate channel 8 which bypasses the mixer 6. A foaming agent is arranged to be fed to the space 7 between the inner wall of the cylinder 5 and mixer 6 through nozzles 9, shown in FIG. 2. At the end of the above described extruder head is mounted an extruder tool, which comprises an outer casing 10 which by means of a nut 11 is mounted to the cylinder 4. Within the casing 10 is arranged a torpedo means 12 through which a telephone wire 20 to be insulated is drawn, as shown in FIG. 1. Around the torpedo 12 is arranged a second torpedo 13 and further, around the tapered parts of said two torpedos 12 and 13 is arranged a conically tapering nozzle piece 14. Channel 7 of the extruder head communicates with torpedo 12 through the casing 10 and the outer torpedo 13 to a groove 15 which terminates into an annular channel 16 between torpedos 12 and 13. Between the outer torpedo 13 and the casing 10 is likewise formed as annular channel 17 which communicates with the channel 8 through the wall of the casing 10. The annular channels 16 and 17 unite into a conical channel 18 contracting towards the wire 20. The width of the channel 18 can be adjusted by moving the conical nozzle piece 14 by means of an adjustment nut 19. Reference numeral 21 schematically designates a control valve for adjusting the flow through the channel 8. The groove 15 is preferably curvilinear and its connection to the annular channel 16 does therefore not appear in FIG. 1.

The process works as follows:

Molten plastic enters along the extruder 1 in the channel 3. The flow is divided into two parts one of which flows unchanged through the channel 8 while the other part is directed to the mixing space 7 where a foaming agent is intermixed therewith. The torpedo 12 forms the flow of plastic and foaming agent into a cylindrical inner layer, and the torpedo 13 likewise forms the flow of plastic into an outer cylindrical layer. As the pressure releases at the end of channel 18 the inner layer will foam and thus the telephone wire 20 is simultaneously coated with two layers, the inner being of foamed plastic and the outer being of solid plastic.

The extruder tool including the torpedos 12 and 13 forming the coaxial annular channels 16 and 17 emerging into the conically tapering channel 18 is known per se but previously the flow of the molten plastic intended for the outer solid insulation layer has been fed to the annular channel 17 from a separate extruder necessitating a complicated installation as, among other things, the connections shall endure high pressures and at the same time be elastic to permit different thermal expansions caused by the separate extruders.

All these problems are eliminated by the provision of the separate branch channel 8 bypassing the foam agent mixing station direct to the extruder tool. The channel 8 may of course be of different shape or position as the one shown in the drawing.

What we claim is:

1. Extruder apparatus for forming a foam-skin insulation on a wire, the foam-skin insulation comprising an inner layer of foamed plastic insulation and an outer layer of solid plastic insulation, the apparatus comprising:

an extruder tool having a passage through which the wire is drawn, the tool also including— an inner annular channel surrounding said passage for feeding the material for forming said inner layer of foamed insulation, and an outer annular channel surrounding both said passage and said inner annular channel for feeding the material for forming said outer layer of solid insulation; and an extruder head adapted to be connected to the discharge end of an extruder and to said extruder tool, the head including— a portion defining an annular mixing space and having mixing means therein, means for injecting a foaming agent into said mixing space, said mixing space leading to said inner annular channel for forming said inner insulating layer, and a bypass channel extending from a position upstream of said means for injecting a foaming agent to said outer annular channel for forming the outer insulation layer on the inner layer.

2. An extruder apparatus as in claim 1, wherein said extruder head comprises two cylindrical parts fitted concentrically one within the other, said bypass channel comprising a groove in one of said cylindrical parts at the interface between said parts.

3. An extruder apparatus as in claim 2, wherein the groove forming said bypass channel is formed on the outer surface of the inner cylindrical part.

4. An extruder apparatus as in any one of claims 1, 2 or 7, further comprising throttle means in said bypass channel for regulating the ratio of the respective flows to said inner and outer annular channels.

5. An extruder apparatus as in claim 4, wherein said extruder head includes a radial bore extending from the exterior of said extruder head to said bypass channel, and said throttle means comprises a valve arranged in said bore.

* * * * *

UNITED STATES PATENT AND TRADEMARK OFFICE
CERTIFICATE OF CORRECTION

PATENT NO. : 4,309,160
DATED : January 5, 1982
INVENTOR(S) : Matti J. Poutanen and Aarne Heino It is certified that error appears in the above-identified patent and that said Letters Patent are hereby corrected as shown below:

Column 4, line 5, "7" should read "3".

Signed and Sealed this

Fifteenth Day of June 1982

[SEAL]

Attest:

GERALD J. MOSSINGHOFF

*Attesting Officer*    *Commissioner of Patents and Trademarks*